April 12, 1966

R. A. HIGGINS 3,246,145

LIQUID DENSITY MEASUREMENT SYSTEM FOR
DETERMINATION OF OIL IN WATER

Filed Dec. 19, 1961

INVENTOR: ROBERT A. HIGGINS

April 12, 1966

R. A. HIGGINS 3,246,145

LIQUID DENSITY MEASUREMENT SYSTEM FOR
DETERMINATION OF OIL IN WATER

Filed Dec. 19, 1961

April 12, 1966  R. A. HIGGINS  3,246,145
LIQUID DENSITY MEASUREMENT SYSTEM FOR
DETERMINATION OF OIL IN WATER
Filed Dec. 19, 1961  3 Sheets-Sheet 3

United States Patent Office 3,246,145
Patented Apr. 12, 1966

---

3,246,145
LIQUID DENSITY MEASUREMENT SYSTEM FOR DETERMINATION OF OIL IN WATER
Robert A. Higgins, Madison, Wis., assignor to Socony Mobil Oil Company, Inc., a corporation of New York
Filed Dec. 19, 1961, Ser. No. 160,509
4 Claims. (Cl. 250—43.5)

This invention relates to the detection of water in oil and more particularly to the detection of water in oil in a flow path by radiation absorption measurements.

The presence of water in a liquid, such as oil, can be detected by subjecting the liquid to irradiation from a radioactive source and detecting the radiation passing through the liquid. Since the absorption of radiation by a liquid increases with an increase in the density of the liquid, an increase in the percentage of water in oil will result in the increased absorption of radiation and therefore a decrease in the radiation detected.

These phenomena have been utilized in the determination of the amount of water in oil flowing through an oil pipe line. For example, in the prior art, a source of intense, high energy gamma rays is positioned on one side of an iron pipe line and a gamma ray detector is positioned on the other side. A recorder interconnected with the detector is utilized to record an indication representative of all of the gamma rays passing through the liquid to the detector as the liquid flows past the source and the detector.

In such a system, high energy gamma rays are necessary in order to obtain measurements through the iron walls of the pipe line. High energy gamma rays, however, are not attenuated and affected very much by a given density change in the liquid. Thus, if density measurements are based upon high energy gamma rays passing through the liquid to be tested, the accuracy of the measurements is reduced.

I have found that more accurate measurements can be obtained if the measurements are based upon low energy radiation rather than high energy radiation passing through the liquid to be tested. Better results are obtained since low energy radiation is attenuated and affected more than high energy radiation by a given density change in the liquid.

Measurements based upon low energy radiation can be obtained by utilizing a radioactive source which emits predominantly low energy radiation and employing an energy discriminator between the detector and the recorder of the system. The energy discriminator is adjusted to be responsive to only the low energy radiation striking the detector, thereby preventing any high energy radiation emitted by the source and striking the detector from affecting the measurements. With a count rate meter interconnected between the discriminator and the recorder, the recorder will record an indication of the integrated count of only the low energy radiation striking the detector.

In accordance with the present invention, the liquid is directed through a test chamber having low density walls relatively transparent to low energy radiation, and the source and detector are positioned on opposite sides of the low density walls.

While a source that emits high intensity radiation of both low and high energy may be employed, in the present invention, a source is preferred, for health reasons, that emits low energy radiation of high intensity and high energy radiation of low intensity. Such a source provides a large amount of low energy radiation for measurement purposes and also does not require a great deal of shielding.

In addition, an even higher count rate of the low energy radiation can be obtained for recording purposes with the use of the same source, by using a radiation detector sensitive to low energy radiation and which emphasizes low energy radiation relative to high energy radiation.

In accordance with the present invention, a system is provided for determining the relative density of a liquid. The system includes a test chamber into which the liquid is introduced for testing purposes. A radioactive source is positioned on one side of the chamber for directing radiation through the chamber by way of the liquid in the chamber, and a radiation detector is positioned on the other side of the chamber for detecting radiation passing through the liquid and the chamber. At least a portion of the walls of the chamber between the source and the detector are of material relatively transparent to low energy radiation. With such structure, the low energy radiation will be allowed to pass freely from the source into the liquid and from the liquid to the detector. An energy discriminator responsive to only a predetermined low energy range is interconnected with the detector, and interconnected with the discriminator is a recorder for recording an indication of the radiation detected within the low energy range.

In accordance with a more specific embodiment of the present invention, the radioactive source is of the type that emits a radiation spectrum in which the intensity of the low energy radiation is relatively high and the intensity of the high energy radiation is relatively low. In addition, a detector is provided which is particularly sensitive to low energy radiation.

For further objects and advantages of the invention, and for a more complete understanding thereof, reference may now be had to the following accompanying drawings wherein:

FIG. 1 illustrates the system of the present invention for determining the amount of water in oil;

FIG. 2 discloses gamma ray spectra emitted by a gamma ray source of the present invention;

Figure 6:
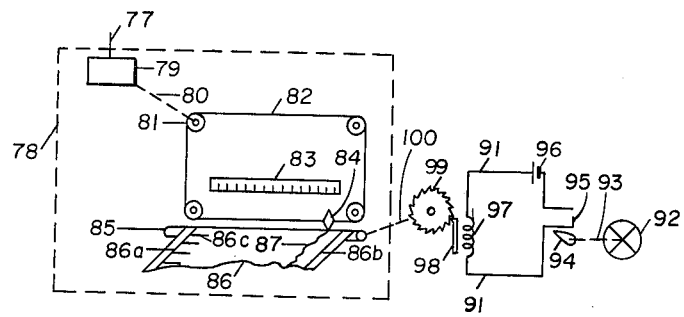
Figure 7:
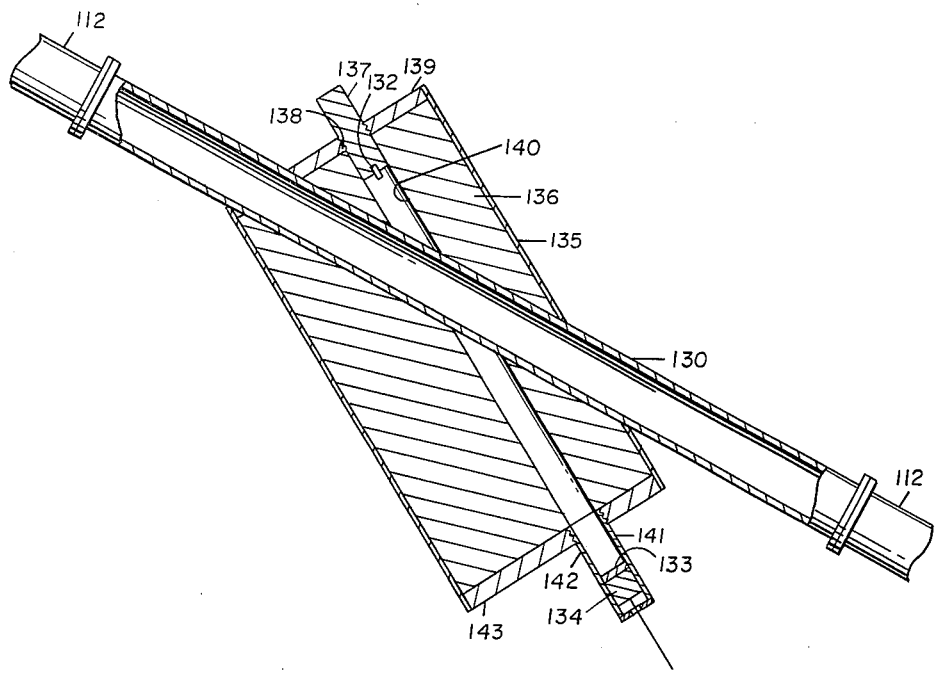

FIG. 6 diagrammatically illustrates the recorder of the present invention as driven by a flow meter in the flow line of the liquid to be tested; and FIG. 7 illustrates another embodiment of the test chamber of the present invention.

Figure 1:
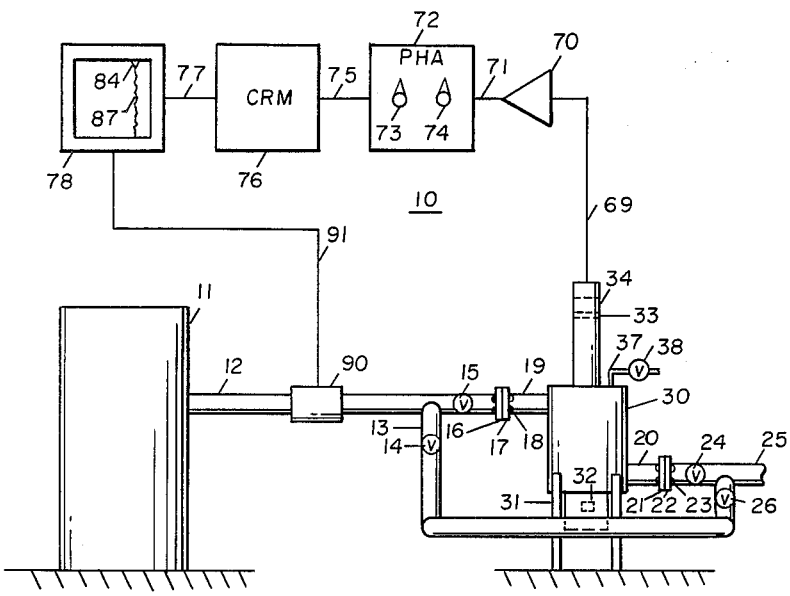

Referring to FIG. 1 of the drawings, there is disclosed a system 10 for continuously determining the percentage or or amount of water in oil by radiation absorption measurements. A test chamber 30 is attached to an oil flow line 12 leading from an oil and gas separator 11. Liquid flows from the line 12 into the chamber by way of inlet 19 and out into line 25 by way of outlet 20. A radioactive source 32 is positioned on one side of the chamber for directing radiation through the chamber by way of the liquid flowing in the chamber. A radiation detector 33 is positioned on the other side of chamber 30 for detecting the radiation passing through the chamber by way of the liquid. The detector 33 is interconnected with a recorder 78 by way of photomultiplier tube 34, amplifier 70, pulse height analyzer 72, and count rate meter 76. The recorder 78 in turn records a trace 87, representative of the percentage of water in oil flowing through the chamber.

The recorder 78 is also interconnected with a flow meter 90 in line 12 whereby the chart of the recorder 78 is driven at a rate proportional to the flow rate of the liquid flowing through the pipe line 12. With such an arrangement, the volume of water and oil passing through pipe line 12 can be obtained from the chart of the recorder as will be described more thoroughly hereinafter. A by-pass line 13 is provided in order to direct the oil in the line 12 around the chamber 30 when it is to be disconnected for cleaning purposes or for other reasons.

Since low energy radiation is attenuated more for a given density change of the liquid than high energy radiation, low energy radiation is desired for measurement purposes in the system of the present invention. A source 32 is used which emits low energy radiation, and the test chamber 30 is provided with low density walls in the direct path of the radiation passing from the source to the detector. With such an arrangement, the low energy radiation emitted from the source 32 will readily pass from the source into the liquid and from the liquid to the detector. In addition, the energy discriminator 72, interconnected between the detector 33 and the recorder 78, is adjusted to be responsive to only the low energy radiation striking the detector. The recorder will therefore record an indication of the integrated count of only the low energy radiation emitted by the source and passing through the liquid to the detector.

Figure 3:
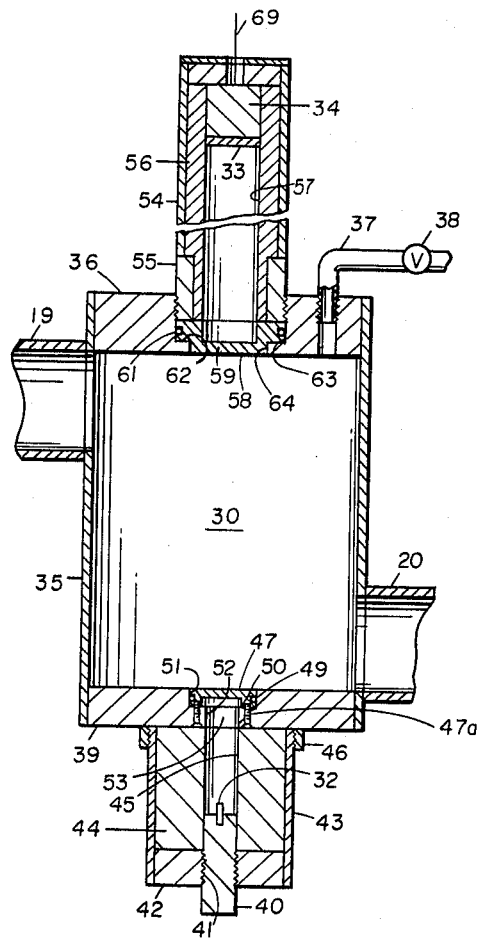
FIG. 3 is an enlarged cross-sectional view of a liquid test chamber of the present invention.

FIG. 3, which is an enlarged cross-sectional view of the test chamber 30, discloses that the low density material can be in the form of windows 47 and 59. A suitable low density material for the windows 47 and 59 is aluminum.

In the operation of the system, radiation is emitted by the source 32 and passes through the low density window 47, the liquid within the test chamber 30, and the low density window 59 before striking the detector 33. The photomultiplier tube 34 converts the energy of the radiation striking the detector into electrical pulses having a magnitude proportional to the energy of such radiation. The electrical pulses are applied to an amplifier 70, illustrated in FIG. 1, by way of line 69 and then to the pulse height analyzer or energy discriminator 72 by way of channel 71. The pulse height analyzer 72 is adjusted to be responsive to only the radiation within a desired low energy band by adjusting the threshold voltage control 73 to make the analyzer responsive approximately to the mid-point of the desired low energy band. The window control dial 74, which controls the width of the energy band to which the anlyzer is responsive, is then adjusted until the analyzer is responsive to the desired low energy band. In this manner, the pulse height analyzer is adjusted to be responsive to only the electrical pulses coming from channel 71 having a magnitude proportional to the energy of the radiation striking the detector within the desired energy range. The desired low energy range is dependent upon the source used, and in one embodiment of the present invention, the desired energy range is within 50–150 kev. for reasons now to be discussed.

Since the system of the present invention is concerned with only low energy radiation, a radioactive source is preferred which emits low energy radiation of a high intensity and high energy radiation of a low intensity. With such a source, a large amount of low energy radiation will be provided for measurement purposes. In addition, a large amount of shielding will not be required since the high energy radiation has a low intensity.

To obtain an even higher count rate from the low energy radiation for recording purposes, a radiation detector can be used which emphasizes the low energy radiation relative to the high energy radiation.

Figure 2:
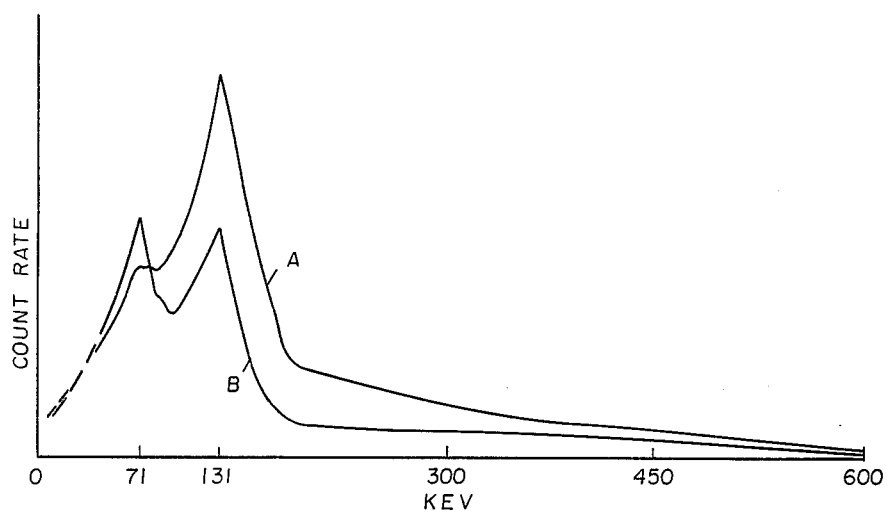

Referring to FIG. 2 of the drawings, there is disclosed gamma ray spectra of a cerium-144-praseodymium-144 source. This source has proved to be very useful in the system of the present invention for determining the percentage of water in oil since it emits a gamma ray spectrum in which the intensity or count rate of the low energy gamma rays is relatively high and the intensity or count rate of the high energy gamma rays is relatively low. Other sources are also available which emit a radiation spectrum in which the intensity of the low energy radiation is relatively high and the intensity of the high radiation is low. One example of another source is strontium-90 which emits Bremsstrahlung radiation. The advantage of strontium-90 is its long half-life of twenty-eight years.

Curves A and B of FIG. 2 represent the spectra of cerium-144-praseodymium-144 as obtained with two sodium-iodide crystals of different sizes. The curves illustrate that the source emits gamma rays having a relatively high count rate at the low energy levels of 71 and 131 kev., respectively.

Curve A was obtained by utilizing a sodium-iodide crystal having a thickness of one-half inch and a diameter of one inch. As can be seen from curve A, the spectral peak at around 71 kev. is relatively lower than the spectral peak at around 131 kev. By using a detector which emphasizes low energy gamma rays relative to high energy gamma rays, a greater response from the low energy gamma rays can be obtained. Such a detector is one which is thin and wide. If a thinner crystal is employed, many of the high energy gamma rays will pass through the crystal without dissipating their energy therein, thereby de-emphasizing the effect of the higher energy gamma rays. If, in addition, the crystal is wide, more low energy gamma rays will be captured. This, in effect, emphasizes the low energy gamma rays.

Curve B illustrates a gamma ray spectrum obtained with a sodium-iodide crystal which was thinner and wider than the sodium-iodide crystal utilized to obtain the spectrum illustrated by curve A. As can be seen, the spectral peak of curve B at 71 kev. is higher than the corresponding spectral peak of curve A. In addition, the spectral peak of curve B at 131 kev. is lower than the corresponding spectral peak of curve A. The sodium-iodide crystal utilized to obtain the curve B had a thickness of two millimeters and a diameter of one and one-half inches.

To utilize only the gamma rays at about 71 and 131 kev. emitted by the cerium-144-praseodymium-144 source, the energy discriminator 72 is made responsive only to the gamma rays striking the detector within the energy range of from about 50 kev. to about 150 kev. The recorder thus records an indication representative of the integrated count of the gamma rays within the energy range of 50–150 kev. striking the detector.

The output of the energy discriminator is applied to count rate meter 76 by way of channel 75. The output of the count rate meter 76 is proportional to the total integrated count of the radiation striking the detector within the desired energy range. The output of the count rate meter in turn is applied, by way of channel 77, to a self-balancing potentiometer 79 of the recorder 78, as illustrated in FIG. 6. The self-balancing potentiometer 79, by way of mechanical connection 80, drives one of the pulleys 81 to move a cord 82. A pen 84 records a trace 87 which is respresentative of the integrated count of the radiation striking the detector within the desired energy range. The pen 84 is attached to the cord 82 and is thus moved relative to the chart 86 and the scale 83. The trace 87 is recorded by the pen 84 as the chart 86 is moved past the pen.

The count rate meter 76 and the recorder 78 are calibrated in a manner, as well known in the art, so that the area between the trace 87 and the bottom boundary line 86a of the chart, is proportional to the percentage of oil flowing through line 12. In addition, the area between the trace 87 and the top boundary line 86b of the chart is proportional to the percentage of water in the oil. The chart 86 of the recorder is driven at a rate proportional to the flow rate of the liquid passing through the line 12 so that the volume of water and oil passing through line 12 can be obtained from the chart 86.

FIG. 6 illustrates an arrangement whereby the chart 86 can be driven at a rate proportional to the flow rate of the liquid passing through pipe line 12. A vane 92, of the flow meter 90, is driven by the liquid flowing through the line 12 and makes a predetermined number of revolutions for each barrel or portion of each barrel of liquid passing through the line 12. For example, the vane may make one revolution for each one-tenth of one barrel of liquid passing through the line 12. A cam 94 is attached to the vane 92 by way of a shaft 93. Upon each revolution of the vane 92, the cam 94 closes the switch 95, thereby allowing current from battery 96 to actuate the solenoid 97. Upon actuation of the solenoid 97, the arm 98 moves a ratchet 99, which in turn drives the chart-supporting shaft 85, by way of mechanical coupling 100.

With such an arrangement, the chart will be driven at such a rate that equal increments of length along the chart, for example, the distance between lines 86c, will be proportional to a certain number of barrels of liquid passing through the line 12. The amount of water passing through the line 12 can be determined by multiplying the percentage of water in oil obtained from the chart by each barrel of liquid passing through the pipe line 12 as obtained from the chart.

Referring again to the test chamber 30 illustrated in FIG. 1, and in FIG. 3, there will now be described the structural arrangements of the chamber. The test chamber 30, supported by legs 31, has an inlet 19 interconnected with line 12 by flange connections 16 and 17, bolts 18, and an outlet 20 interconnected with line 25 by flange connections 21 and 22 and bolts 23. When the chamber is to be disconnected for cleaning purposes or otherwise, valves 14 and 26 in the by-pass line 13 are opened and valves 15 and 24 closed.

The test chamber 30, illustrated in FIG. 3, is formed by a cylindrical wall 35, a top member 36, and a bottom member 39. Low density windows 47 and 57 of aluminum are positioned within the members 36 and 39, respectively.

The radioactive source 32 is attached to a source support 40, which in turn is threaded into an aperture 41 in an end member 42 of the cylindrical source holder 43. Attached to the inner surface of the source holder 43 is a cylindrical shield 44 of lead, having a small aperture 45. The shield 44 acts as a collimator in that it allows the radiation emitted in the direction of the detector 33 and through the aperture 45 to pass into the chamber. A high percentage of all other radiation, however, will be absorbed by the shield 44. The source holder 43 is threadedly attached to flange 46 which is welded to the lower end member 39. Low density window 47 is seated on a shoulder 50 which is formed between inner surfaces 51 and 52 of the aperture 53. Screws 47a hold the window 47 in place.

Figure 4:
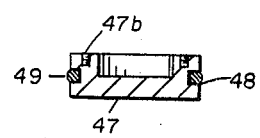

As seen in FIG. 4, which is an enlarged view of the window 47, the window has an outer groove 48 in which is seated a rubber O-ring 49. The O-ring enables the window 47 to be press-fitted into the aperture 53 and provides a fluid-tight seal to prevent the fluid from damaging the source. Threaded apertures 47b are provided for the screws 47a.

The detector 33 and the photomultiplier 34 are positioned within a cylindrical detector housing 54, which is welded to a threaded connector 55. Positioned within the housing 54 is a long cylindrical lead shield 56, having a small aperture 57. The shield 56 acts as a collimator in that it allows the radiation entering the aperture 57 from the chamber 30 to strike the detector if the radiation enters the aperture 57 in a path nearly parallel to the longitudinal axis of the shield 56. A high percentage of all other radiation entering the aperture 57 will be absorbed by the walls of the shield 56. The detector housing 54 is attached to the chamber 30 by threading the connector 55 into the aperture 58. Before the housing 54 is attached to the chamber 30, low density window 59 is seated on a shoulder 62 which is formed between inner surfaces 63 and 64 of aperture 58.

Figure 5:
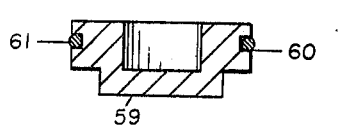
FIGS. 4 and 5 are enlarged cross-sectional views of low density windows utilized in the test chamber of FIG. 3.

As can be seen in FIG. 5, which is an enlarged view of the window 59, the window 59 also has an outer groove 60 in which is seated an O-ring 61. The O-ring 61 enables the window 59 to be press-fitted into the aperture 58 and provides a fluid-tight seal to prevent the fluid from damaging the detector.

In assembling the low density windows 47 and 59 and the detector housing 54 to the test chamber, the source holder 43 is removed and the window 47 is positioned in place through the top aperture 58. Screws 47a are then applied to hold the window 47 in place and source holder 43 is attached to the chamber 30. The window 59 is next inserted in position and the housing 54 attached to the chamber 30. The end portion of member 55 securely holds the window 59 in its proper position.

In the embodiment of FIG. 3, the aperture 45 was one inch in diameter and the aperture 57 was one and one-half inches in diameter. The source 32 was positioned two and one-half inches from the window 47 and the detector 33 was positioned ten inches from the window 59.

In the present invention a relatively long absorption path through the liquid is desired, since a long absorption path through the liquid will cause a greater change in the amount of radiation passing through the liquid for a given density change. In the embodiment of FIGS. 2 and 3, the absorption path was ten inches and the oil line 12 had an inside diameter of three inches. The valve 38, interconnected with the interior of the chamber by way of line 37, was provided to remove the gas and air which may come out of solution due to the disrupted flow and the pressure drop encountered as the liquid flows from the line 12 into the large chamber 30. If the gas trapped at the top of the chamber is not removed, the absorption path through the liquid will be shortened resulting in inaccurate measurements.

FIG. 7 discloses another embodiment of the present invention in which the test chamber 130 has the same inside diameter as the oil pipe line 112. A housing member 135, containing a source 132 and a detector 133, is attached to the chamber 130 at an angle in order to obtain the desired absorption path through the liquid. With such an arrangement, little or no pressure drop will be encountered as the oil flows from the line 112 into the chamber. Thus, the desired absorption path through the liquid can be obtained without causing air or gas to come out of solution even though the pipe line to be tested is relatively small. If the oil line 112 is of a larger diameter, a chamber 130 with a larger diameter can be utilized and the housing member 135 can be attached to the chamber in a manner more perpendicular to obtain the same absorption path.

In the embodiment of FIG. 7, the test chamber 130 is made of aluminum. The aluminum chamber 130, connected to the oil line 112, has attached thereto the housing member 135 filled with a shielding material 136, such as lead. Positioned at one end of the housing 135 is the radioactive source 132. The radioactive source is attached to a source holder 137, which is threaded into an aperture 138 in the end member 139. The shielding material 136 has an aperture 140 for the passage of radiation from the source to the chamber and from the chamber to the detector. The portion of the chamber walls which traverses the aperture 140 in effect forms windows of aluminum through which the low energy radiation may pass freely from the source to the detector by way of the liquid in the chamber. The aperture 140 is offset with respect to the housing member 135 in order to provide a sufficient amount of shielding around the source on the side next to the chamber 130. At the other end of the housing 135 there is positioned the radiation detector 133 and a photomultiplier tube 134. The detector and the photomultiplier tube are positioned within a support 141, which is threaded into an aperture 142 in the end member 143.

In one embodiment of the invention, the pulse height analyzer was of the type manufactured by the Radiation Counter Laboratories, 5121 West Grove Street, Skokie, Illinois, Model No. 20,506, and the count rate meter was of the type manufactured by the Radiation Counter Laboratories, Model No. 20,407. The cerium-144-praseodymium-144 source was produced by the U.S. Nuclear Corp., Burbank, California, and was of 180 millicuries strength in a Type 375 capsule. The flow meter was a positive displacement flow meter, Type B-12, manufactured by A. O. Smith, Milwaukee, Wisconsin. The solenoid was a Ledex Digimotor Rotary Ratcheted Solenoid, Model No. 215,229, manufactured by G. H. Leland, Inc., Dayton 2, Ohio.

A strontium-90 source which emits Bremsstrahlung radiation can be used instead of a cerium-144-praseodymium-144 source. A suitable strontium-90 source, useful in the practice of the present invention is available from the U.S. Nuclear Corp., Burbank, California, and indentified as Source D-185, Series 3327. The radiation spectrum of this particular source exhibits a high intensity peak within the energy range of around 50–200 kev., the mid-point of the peak being around 100 kev.

Now that the invention and certain modifications have been described, other modifications will become apparent to those skilled in the art all within the scope of the appended claims.

When the word "opposite" is used in the appended claims, it is not intended to mean that the radiation source and the detector are diametrically exactly opposite across the fluid to be measured or that they are exactly horizontally opposite, but rather that they are opposite in a general sense so that the detector may receive radiation from the radiation source after it passes through the liquid under test and thus can furnish the desired information. In any case, where it is so intended, the source of radiation and the detector will be stated to be directly opposite.

What is claimed is:

1. A system for determining the percentage of water and oil flowing through a pipe line, comprising a test chamber interconnected with said pipe line whereby the liquid flowing in said pipe line will be directed through said chamber, a radioactive source that emits a predetermined radiation spectrum in which the intensity of the low energy radiation is relatively high and the intensity of the high energy radiation is relatively low, said source being positioned on the outside of said chamber at one side thereof for directing radiation through said chamber by way of liquid in said chamber, a radiation detector sensitive to low energy radiation for emphasizing low energy radiation relative to high energy radiation, said detector being positioned on the outside of said chamber at the side opposite said source for detecting radiation passing through said chamber by way of said liquid, at least a portion of the walls of said chamber between said source and said detector being of low density material, an energy discriminator interconnected with said detector and responsive to only said low energy radiation of a relatively high intensity, a recorder interconnected with said discriminator for recording an indication of the low energy radiation detected, a movable chart associated with said recorder, means interconnected with said pipe line and said chart for driving said chart at a rate proportional to the rate of flow of said liquid through said pipe line, and means for continuously recording on said chart the percentage of water and oil flowing through said pipe line.

2. The system of claim 1 wherein the walls of said chamber between said source and said detector are of aluminum.

3. The system of claim 1 wherein said chamber is in the form of a cylinder having the same cross section as said pipe line and said source and said detector are positioned on opposite sides of said chamber in such a manner that the direct radiation absorption path through the liquid from said source to said detector is oblique with respect to the axis of said chamber and is thereby greater than the radiation absorption path obtained at an angle normal to the axis of said chamber.

4. The system of claim 1 wherein a valve is interconnected with the interior of said chamber for removing gas and air trapped at the top of said chamber.

References Cited by the Examiner

UNITED STATES PATENTS

| 2,613,325 | 10/1952 | Herzog | 250—43.5 |
| 2,722,609 | 11/1955 | Morgan | 250—43.5 |
| 2,953,681 | 9/1960 | Frazier | 250—43.5 |
| 2,959,932 | 11/1960 | Spergel | 250—43.5 |

FOREIGN PATENTS 793,301   4/1958   Great Britain.

OTHER REFERENCES

Upson et al.: "Analyzing for Low-Energy Gamma Emitters in a Radio-Nuclide Mixture," Nucleonics, vol. 13, No. 4, April 1955, pp. 38 to 41.

RALPH G. NILSON, *Primary Examiner.*